United States Patent [19]

Farrar et al.

[11] 4,426,217
[45] Jan. 17, 1984

[54] ELECTRIC MELTING OF SOLIDIFIED GLASS IN MELTING UNITS

[75] Inventors: Gordon A. Farrar, Newark; Melvin R. Friemoth, deceased, late of Newark, Ohio, by Jean M. Friemoth, Executrix

[73] Assignee: Owens-Corning Fiberglas Corporation, Toledo, Ohio

[21] Appl. No.: 378,542

[22] Filed: May 17, 1982

[51] Int. Cl.³ .............................................. C03B 5/027
[52] U.S. Cl. ........................................ 65/135; 65/128; 65/129; 65/326; 65/337; 65/DIG. 4
[58] Field of Search ................... 65/DIG. 4, 337, 326, 65/327, 135, 128, 129

[56] References Cited

U.S. PATENT DOCUMENTS

| 2,186,718 | 1/1940 | Ferguson | 65/128 |
| 3,198,619 | 8/1965 | Nuzum | 65/DIG. 4 X |
| 3,400,204 | 9/1968 | Gell | 65/337 |
| 3,842,180 | 10/1974 | Froberg et al. | 65/DIG. 4 X |
| 3,891,422 | 6/1975 | Froberg | 65/137 |
| 3,954,433 | 5/1976 | Holler | 65/29 |
| 3,997,710 | 12/1976 | Maddux | 13/6 |

FOREIGN PATENT DOCUMENTS 2524612 12/1975 Fed. Rep. of Germany ........ 65/337
2842505 11/1979 Fed. Rep. of Germany ... 65/DIG. 4

*Primary Examiner*—Arthur D. Kellogg
*Attorney, Agent, or Firm*—Ronald C. Hudgens; Patrick P. Pacella; Ronald E. Champion

[57] ABSTRACT

A method and apparatus for electrically melting solidified glass in difficult to reach regions of a glass melting furnace not readily accessible with fossil fuel heating means and, more particularly, to an electrode arrangement for electrically heating solidified glass in difficult to melt regions such as a submerged outlet throat between a furnace melter section and the riser through which the glass is supplied in production.

9 Claims, 3 Drawing Figures

ELECTRIC MELTING OF SOLIDIFIED GLASS IN MELTING UNITS

TECHNICAL FIELD

This invention is a method and electrode arrangement for electrically melting solidified glass in difficult to reach regions of a glass melting furnace not readily accessible with fossil fuel heating means and more particularly to electrical heating of solidified glass in regions such as a submerged outlet throat between a furnace melter section and the riser through which the glass is supplied in production.

During period of curtailment of furnace operations in the production of glass, the practice has been to maintain the upper region of the melter section and the outlet throat at a low temperature by supplying a low level of heat thereto. Upon decision to restart the furnace, the start-up time can thus be minimized as well as the thermal shock and mechanical stress of startup of the furnace.

The cost of energy for maintaining furnaces in a heated condition over such an extended period, for example, in the order of months, however, is an extremely costly non-productive burden. To eliminate such high cost, two alternate approaches are possible, one being to drain the furnace completely upon shutdown, and the second is to allow the glass to completely solidify in the furnace.

When a glass melting furnace is completely drained during down times, restart procedures correspond much to those of start-up of a new furnace. Restart of a completely drained furnace, however, has the disadvantage that spalling of refractory and cracking under thermal stress can result in areas of previous wear of the furnace.

Restart of a furnace with solidified glass of the previous melt therein is often found more desirable in that it reduces the thermal shock difficulties. Where a submerged throat exists in the outlet end of the furnace, however, remelting of the solid glass in the throat is extremely difficult to accomplish because of its inaccessability to external sources of heat in addition to remoteness of heat of the melt.

Accordingly, it is a general object of the present invention to provide a method and means for melting solidified glass in the difficult to reach regions of a glass melting furnace.

More particularly, it is an object of the present invention to provide a method and means for electrically melting solidified glass in a submerged throat between the melter and the riser sections of a glass melting furnace.

BRIEF DESCRIPTION OF THE INVENTION

Solidified glass in a submerged throat of a glass melting furnace is melted according to the invention by the step by step thawing or melting of glass between each adjacent pair of a series of electrodes spaced apart from each other in a path extending from a position just before the entry to the throat to a position at the riser. The spacing of the electrodes in the series is such that when power is applied between any two adjacent electrodes when molten material exists about one of the electrodes, a Joule effect conductive path is provided to the next adjacent electrode. Under such condition, glass between the two electrodes can be melted by supply of electric energy between the two adjacent electrodes. Molten glass is then, in turn, provided about the second electrode to permit Joule effect heating of glass between it and the next succeeding electrode of the series as well as between such next electrode and the first electrode. Thus, solidified glass between each successive adjacent pair of electrodes can be melted step-by-step to provide a continuous molten path through the throat to the riser whereupon the glass can be supplied for production and conventional heating of the glass can be relied upon.

A feature of the invention is that it allows curtailment of glass production by complete shutdown of a furnace without requiring full drainage of the glass or requiring that it be maintained hot during the shutdown period.

Another feature of the invention is that it maximizes production for the energy input regardless of fluctuating demands for output.

DESCRIPTION

Figure 1:
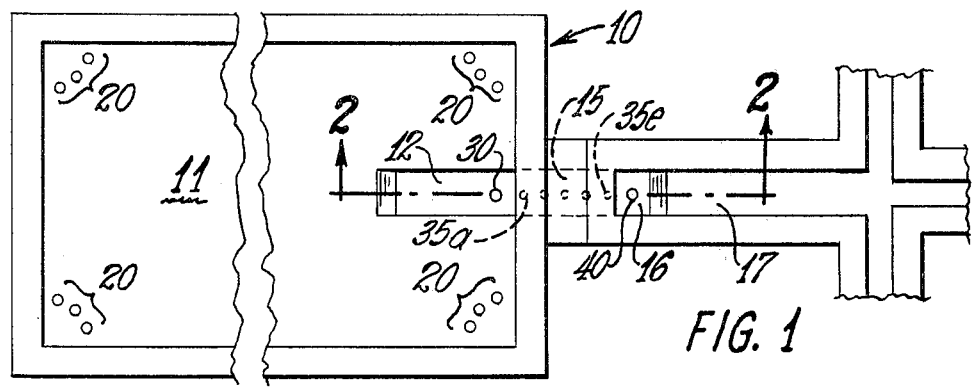
FIG. 1 is a broken away plan view illustrating an electric glass melting furnace with a submerged throat and riser in its exit end leading to a forehearth from which molten glass is supplied for production of products such as glass fibers.
Figure 2:
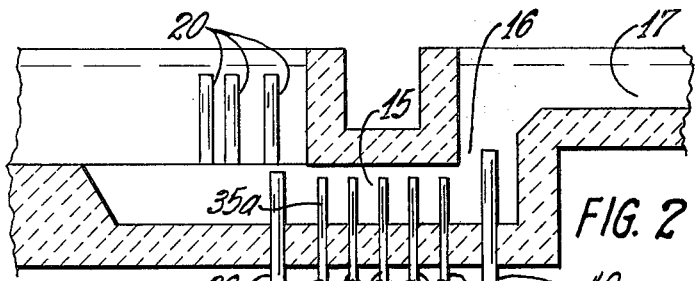
FIG. 2 is a cross sectional view taken on line 2—2 of the throat portion of the electric furnace represented in FIG. 1.
Figure 3:
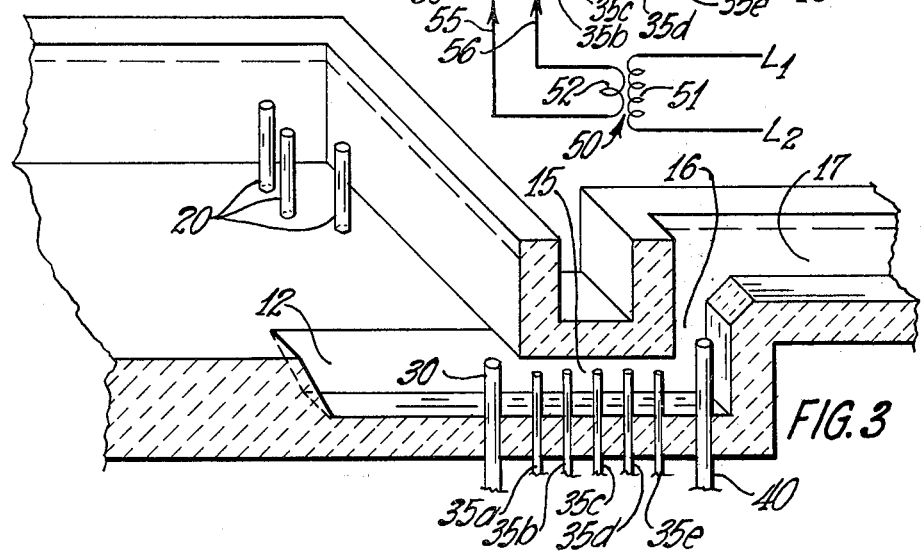
FIG. 3 illustrates in perspective the submerged throat represented in cross section in FIG. 2 showing the electrodes inserted in the submerged channel for melting solidified glass therein.

Referring to the drawings in greater detail, FIG. 1 illustrates a plan view of an electric furnace 10 having a melting region 11 heated by electric power supplied by way of electrodes 20 located in the four corners of the furnace. The furnace here illustrated is of the cold top type in which the batch is supplied to the top of the molten mass within the furnace, such batch being melted at its interface with the underlying molten pool of glass. As the molten glass is heated by the power supplied at the electrodes 20, it is withdrawn for use in production of products through a recessed channel or slot 12 located at the mid-region of one wall of the furnace. Thus glass is flowed through an outlet throat 15 to a riser 16 connected to the furnace forehearth 17 for the supply of glass to units for production of products such as glass fibers.

In supplying glass from the furnace through a submerged throat, as illustrated, it is conventional to provide supplementary heat by way of electrodes 30 and 40 located in the slot 12 leading to the throat 15 and at the exit from the throat in the region of the riser 16, respectively. Thus, the glass flowing from the melting region can be controlled in temperature by supply of the supplementary heat before its introduction into the forehearth. This arrangement is quite advantageous in assuring proper and stable temperature of the glass output from the melting region upon its introduction into the forehearth for use in production.

As hereinabove described, production at times is required to be curtailed, usually for economic reasons, and the downtime can continue for extended periods such as a matter of weeks or even months. Whereas it has been a practice to maintain such furnaces in a heated condition under low power supplied from electrodes 20, because of the high cost of drainage and restart of an empty furnace, it is more desirable to shut down the furnace with a full load of glass contained therein. Such shutdown of the furnace, however, has a disadvantage in that certain regions of the furnace, such as the submerged throat, when loaded with solidified glass is extremely difficult or practically impossible to melt by conventional means for reinitiation of the flow of glass output.

According to the present invention, one or more auxiliary or supplementary electrodes are specially inserted or permanently provided in the difficult to reach regions, such as the submerged throat 15. In the arrangement illustrated, a series of electrodes 35a, 35b, 35c, 35d and 35e are provided in spaced relation within the throat 15 between the main power supply electrodes 30 and 40 located at the entry and exit ends of the throat respectively. In normal operation of the furnace glass flows from the melting region 11 into the recessed channel or slot 12 and upon passage through the throat 15 to the riser 16 and forehearth 17, it is controlled in temperature by supply of additional heat by Joule effect current flow between the electrodes 30 and 40. The power of electrodes 30 and 40 is supplied from transformer 50 which has a primary 51 and a secondary 52 connected to the electrodes 30 and 40. However, when the furnace is shut down and the glass is allowed to solidify in the melting region 11 and the throat 15 these electrodes are ineffective to melt the solidified glass because of the non-conductivity of the glass in its solidified condition.

When glass in a furnace is allowed to solidify or otherwise approach solidity in an area such as the melting region, it can ordinarily be remelted such as with a combustion burner to melt the desired solidified regions. In the case of an electric furnace 10, the glass surface in the regions of the electrodes can be selectively melted to establish a conductive path between electrodes 20 of opposite potential and, therefore, melting can continue by application of power to the electrodes to promote the flow of Joule effect current and thus progressively reestablish a molten pool.

Solidified glass in the throat 15 of the furnace, however, cannot be so reached with a combustion burner and, accordingly, reestablishment of flow through the throat by such means is usually practically impossible. Although the glass about the electrode 30 might be melted, no conductive path is provided through the throat because of the non-conductive solidified glass therein between the electrodes 30 and 40. Thus, where electrodes 35a to 35e are not permanently in place, a series of such electrodes can be installed by drilling through the refractory underlying the throat 15 for insertion of as many electrodes 35 as are necessary for progressive melting of the glass between the electrode 30 to the electrode 40.

More specifically, molten glass of the melting region is present about the electrode 30 after conventional heating of the glass in the melting region 11. The molten glass about the electrode 30 then allows establishment of an electrically conductive path between it and the adjacent electrode 35a. Thus, when the power output of the transformer 50 is applied between electrode 30 and 35a, glass can be melted between these two electrodes. In addition, glass can be melted in the region about the electrode 35a in sufficient amount to permit establishment of a conductive path between electrodes 35a and 35b. The secondary lead 56 of the transformer 50 can then be removed from the electrode 35a and connected in turn to electrode 35b to establish a Joule effect conductive path between the electrodes 30 and 35b. The glass about the electrode 35b can thereupon be melted to permit subsequent flow of current between 35b and 35c by connection of the transformer lead 56 to electrode 35c. The solidified glass in the throat 15 can thus be progressively melted by successive connection of the transformer secondary lead 56 to each of the electrodes 35a to 35e, one at a time until a complete conductive path of molten glass is established between electrodes 30 and 40, whereupon conventional heating of the throat glass can be resorted to by steady supply of power thereto.

As a variation of this procedure, a voltage can be established between electrodes 30 and 40 to maintain a potential difference therebetween during the sequential application of voltage in advancing relation from electrode 30 to 35a, 35b, 35c, etc. by moving the jumper 56 of secondary 52 of the transformer 50 to each succeeding electrode as the melt is advanced through the throat. Thus, the voltage between electrodes 30 and 40 will take over as soon as the mass of glass in the throat is sufficiently conductive to effect a generation of heat.

As still another variation of the described arrangements, the electrodes 35a to 35e can be permanently installed with a sequencing circuit designed to both provide heat when necessary during operation of the furnace and to automatically advance application of power to the melt in the throat from a cold start without need for manually connecting jumpers from one electrode to another as the glass is melted therein. In addition, electrodes in the throat may be grouped and sequenced or might be aligned with different spacing in staggered relation through the throat.

Thus, while certain arrangements of the present invention have been described, it will be apparent to those skilled in the art that various changes and modifications may be made therein without departing from the spirit and scope of the invention as claimed.

We claim:

1. A method of melting solidified glass in a submerged throat of a glass melting furnace comprising providing at least a first electrode in the melter chamber supply slot, providing a second electrode in the covered submerged throat, heating glass about said first electrode to a conductive condition around said first electrode and supplying electric energy between said first electrode and said second electrode to establish a Joule effect conductive path therebetween to more fully melt the glass therebetween, subsequent electrodes adjacent said second electrode along the length of the covered submerged throat, sequentially supplying electric energy between said first electrode and subsequent electrodes along said submerged throat to sequentially thaw the solidified glass by conduction of heat from the region between the first electrode and second electrode until the glass around the subsequent electrodes become conductive and electric power for Joule effect heating can be applied to subsequent electrodes in the submerged throat until all of the glass in the submerged throat is molten.

2. The method of claim 1 wherein adequate electric energy is supplied to said first electrode and said second electrode to melt the glass about said second electrode and between said second electrode and said subsequent electrodes.

3. The method of claim 2 wherein the subsequent electrode is a third electrode in said submerged throat which is within electrically conductive reach of said second electrode and supplying electrical energy between said first and said third electrode to melt glass in said submerged throat beyond said second electrode.

4. The method of claim 2 wherein the subsequent electrodes are a series of electrodes in spaced relation extending along the submerged throat including said second electrode and said series of electrodes are energized in sequence beginning with said first electrode as an entry electrode to the region located in the channel of the melter section and the last electrode of the series as an exit electrode outside the submerged throat in the riser section to progressively melt glass about each such electrode thereby to progressively advance the conductive path between adjacent electrodes in the series until a conductive path is established between said entry or first electrode and exit or last electrodes for establishment of a glass flow pat through said submerged throat.

5. An electrode arrangement for melting solidified glass in a submerged outlet throat of a glass melting furnace comprising a series of spaced apart electrodes including a first electrode at the entry to the throat and a last electrode at the exit of the throat, at least one additional electrode in said throat between said first and said last electrode, means for melting glass around said first electrode to provide molten glass between said first electrode and said additional electrode, electric energy means for establishing a Joule effect current therebetween for melting glass about said additional electrode to provide molten glass for establishment of a conductive path between said additional electrode and its next adjacent electrode, sequentially applying electric energy means between said first electrode and said next adjacent electrode until a molten glass conductive path is completed through the submerged throat between said first electrode and said last electrode.

6. A glass melting furnace electrode arrangement as defined in claim 5 wherein said electric energy means includes a means to sequentially supply the said electric energy means between said first electrode and subsequent electrodes along said submerged throat as the solidified glass becomes electrically conductive along said submerged throat.

7. A glass melting furnace electrode arrangement as defined in claim 6 wherein said electric energy means is connected in such a manner to supply electric energy between said first electrode and each said additional electrode sequentially until said electric energy means supplies electric power between said first electrode and said last electrode.

8. A glass melting furnace electrode arrangement as defined in claim 6 wherein at least two additional electrodes exist in a series adjacent relationship between said first electrode and said last electrode, and each such additional electrode is energized by electric energy means in sequence to melt glass thereabout.

9. A glass melting furnace electrode arrangement as defined in claim 5 wherein a sequencing means is provided for energizing said additional electrodes in sequence to melt glass about each additional electrode in turn until a molten conductive path is provided between said first electrode and said last electrode.

* * * * *